Nov. 11, 1924.
J. D. MORGAN
1,514,779
MACHINE FOR MAKING STEREOTYPE PLATES
Filed April 12, 1921    4 Sheets—Sheet 3
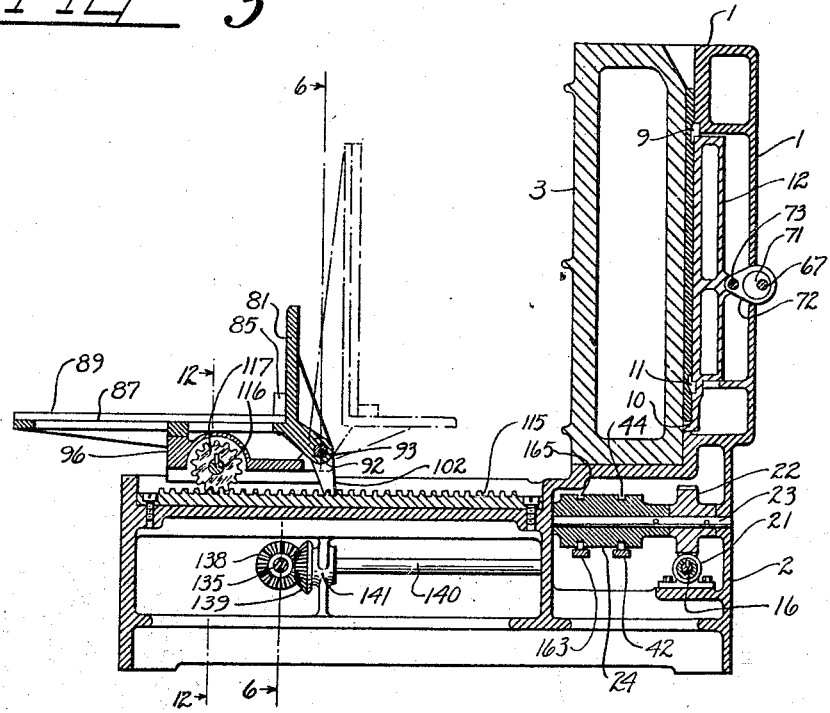
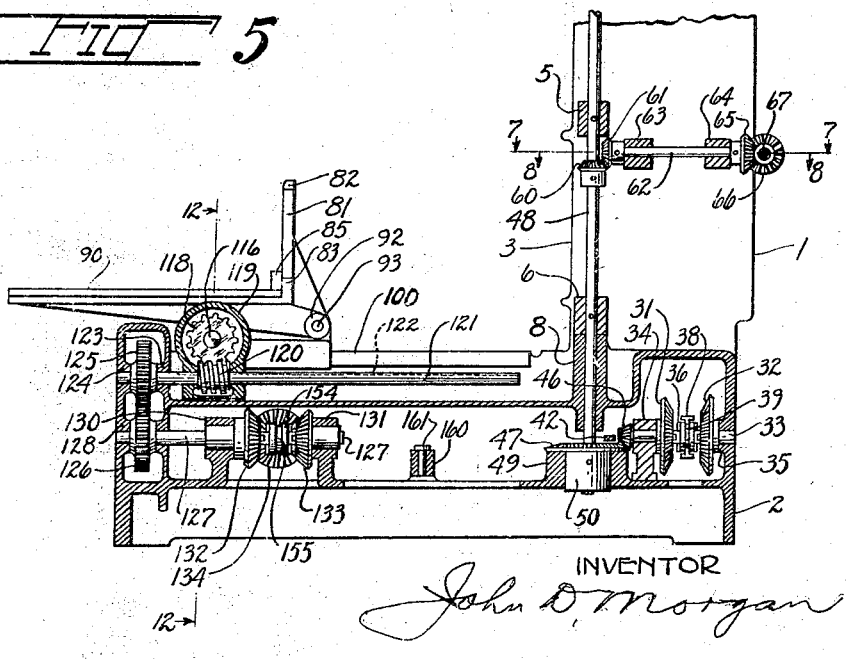
INVENTOR
John D. Morgan

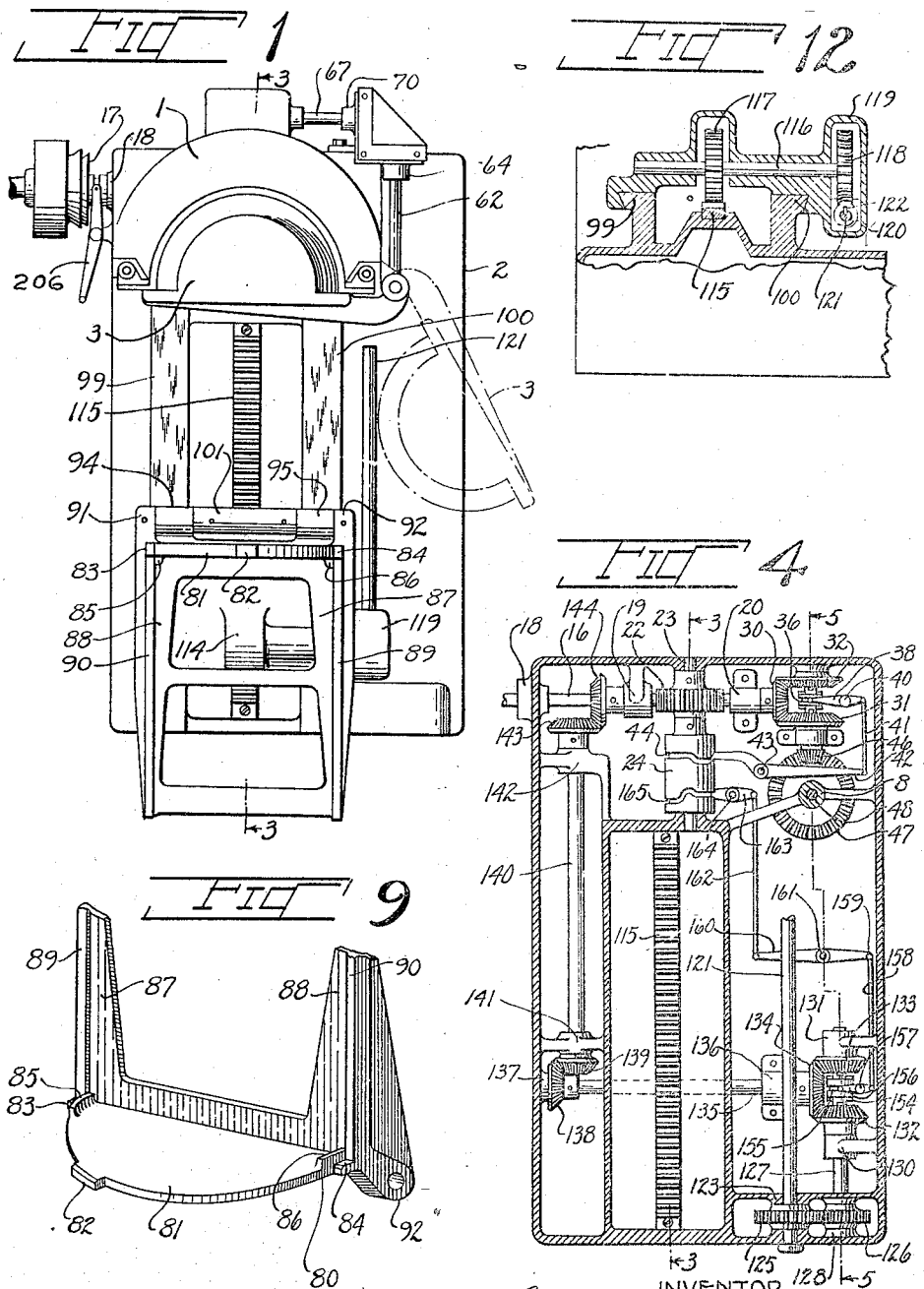

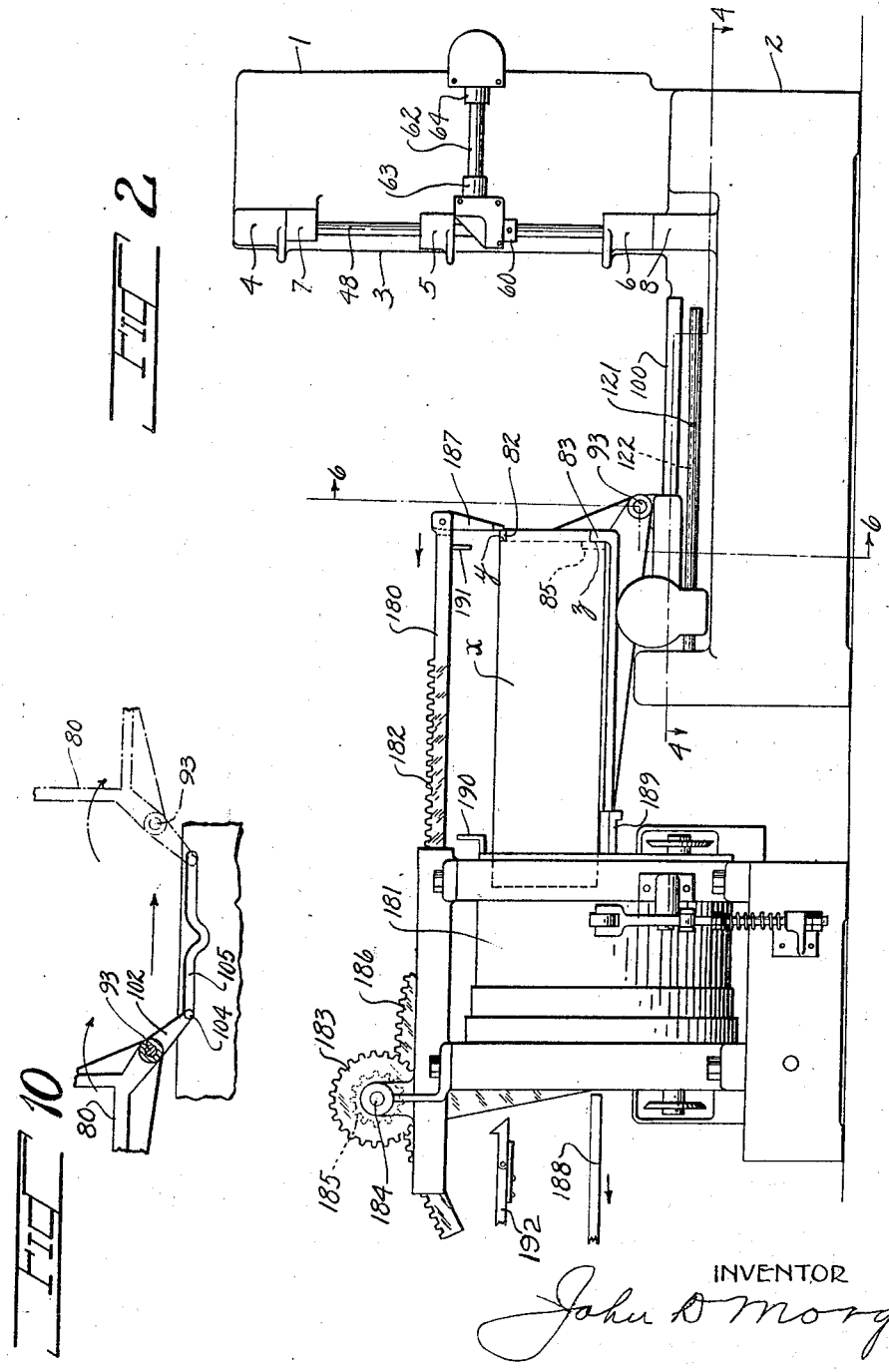

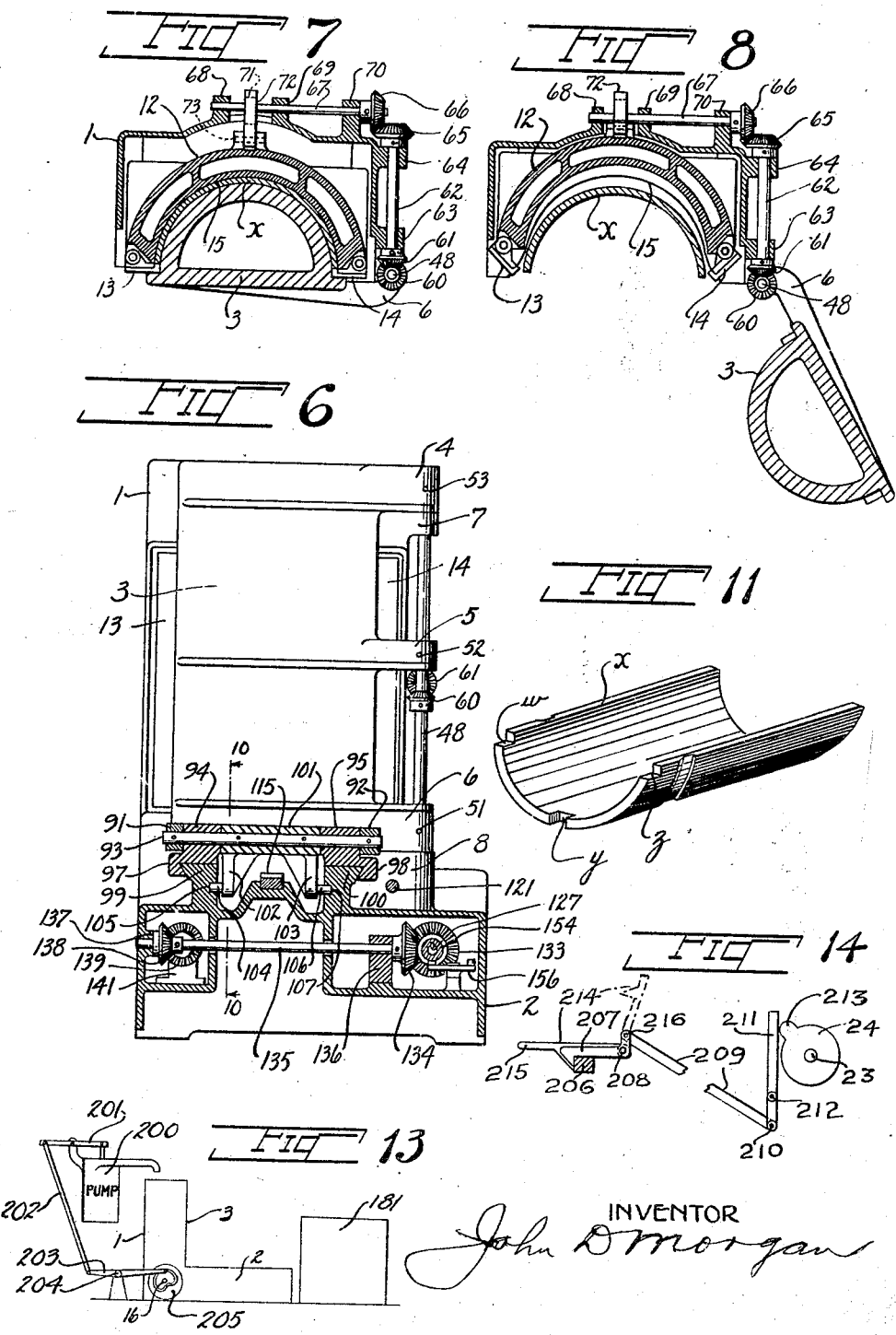

Patented Nov. 11, 1924.

1,514,779

UNITED STATES PATENT OFFICE.

JOHN D. MORGAN, OF SUMMIT, NEW JERSEY, ASSIGNOR TO GOSS PRINTING PRESS COMPANY, A CORPORATION OF ILLINOIS.

MACHINE FOR MAKING STEREOTYPE PLATES.

Application filed April 12, 1921. Serial No. 460,833.

*To all whom it may concern:*

Be it known that I, JOHN D. MORGAN, a citizen of the United States, residing at Summit, in the county of Union and State of New Jersey, have made certain new and useful Improvements in Machines for Making Stereotype Plates, of which the following is a specification.

The invention relates to machines for making stereotype printing plates, and more particularly to novel means and mechanisms relating to plate casting devices, plate carrying or conveying devices, and plate trimming devices and novel means of cooperation therebetween.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan of a machine embodying the invention, omitting the trimming mechanism;

Fig. 2 is a side elevation, looking at Fig. 1 from the right, and showing the trimming mechanism;

Fig. 3 is a vertical, central section taken on the lines 3—3 of Figs. 1 and 4;

Fig. 4 is a horizontal section taken on line 4—4 of Fig. 2;

Fig. 5 is a vertical, longitudinal section, taken on line 5—5 of Fig. 4;

Fig. 6 is a view, partly in elevation and partly in section taken on line 6—6 of Figs. 2 and 3;

Figs. 7 and 8 are the same horizontal section taken on line 7—7 and 8—8 of Fig. 5;

Fig. 9 is a detached isometric detail of the plate carrier;

Fig. 10 is a fragmentary detail elevation of a part of the mechanism for turning the plate carrier to and fro between vertical and horizontal positions, the machine frame being shown on line 10—10 of Fig. 6, but the plate carrier is shown in elevation in front of it;

Fig. 11 is a perspective of the cast stereotype plate;

Fig. 12 is a detached, fragmentary section on line 12—12 of Figs. 3 and 5, showing the drive for the reciprocating plate carrier;

Fig. 13 is a diagrammatic view showing a hot metal supply in automatic cooperation with the casting and trimming mechanism; and Fig. 14 is a diagrammatic view of an automatic clutch control.

The present preferred embodiment of the invention, referring preliminarily to its general features, provides a stereotype plate making machine which comprises casting mechanism, plate trimming mechanism and an intermediary plate carrier or conveyor, all operating automatically and having novel constructions, parts and features as hereinafter described.

The plate after casting is left in the drag by the opening or separation of the core and drag, the automatic plate carrier engaging the plate in the drag and delivering it into the trimming mechanism and automatically starting the trmming mechanism into operation, the trimming mechanism in turn automatically delivering the finished plate therefrom.

As herewith preferably embodied, the casting chamber is vertically disposed, the automatic carrier engaging the plate and supporting it by its bottom curved edge, the plate carrier turning while carrying the plate and delivering the plate into the trimming mechanism in horizontal position, while resting on its straight edges. As embodied, the core swings away from casting position on a vertically disposed axis and is automatically operated in timed relation with the other operations of the machine.

The concave casting member, or drag, as it is usually styled, is vertically disposed, as embodied, and is preferably fixed in position although it could be swung to horizontal position for changing matrix sheets. The drag is also provided with an automatically receding back and with spring operated matrix-holding clamps or jaws, mounted on the receding back portion of the drag, whereby the matrix sheet is stripped from the cast plate automatically while the plate is in position within the drag, preparatory to the plate being automatically taken away by the plate carrier.

Other features of the invention will be initially set forth in connection with the following detailed description of the present preferred embodiment of the invention, but it will be understood that both the preceding general description and the following detailed description are exemplary and explanatory and are not restrictive of the invention.

Referring now in detail to the embodiment of the invention, illustrated by way of example in the accompanying drawings, a casting couple is shown consisting of a vertically disposed drag or concave casting member 1, which is preferably in fixed position upon the general frame 2 of the machine. Cooperating therewith is the convex casting member or core 3, which is movable toward and from casting position, and as shown herein (Figs. 1, 2 and 6), swings to and from casting position about a vertically disposed axis. The core 3 is provided with hinge members 4, 5 and 6, the member 4 resting upon a corresponding hinge member 7 formed on the frame or extending out from the stationary drag, and hinge member 6 resting upon a supporting member 8 formed on the machine frame. The open or non-casting position of the core 3 is shown in broken lines in Fig. 1.

The drag and core will be provided with the usual spaces for the cooling water, shown herein only conventionally, and suitable piping in connection therewith for supplying the water will be provided of any convenient or adequate form, the same being omitted from the drawings.

The receding back of the drag, which is the portion thereof located just behind the matrix sheet, and the cooperating automatic stripping clamps for the matrix sheet are shown only generally so far as concerns their specific structure, but they are constructed and arranged in the machine to operate automatically as the core swings away from the drag and preparatory to the plate carrier taking the plate out of the drag. The receding back 12 is shown generally in Figs. 3, 7 and 8, and the spring matrix clamps 13 and 14 are shown in casting position in Fig. 7 and are shown in matrix stripping position in Fig. 8, the matrix being marked by reference numeral 15, and the plate by $x$. The detailed construction of the receding back and the automatically operating matrix clamps may be substantially the same as is shown and described in copending application Ser. No. 408,203 of Albert A. Henzi, filed September 4, 1920.

Referring now in detail to the actuating and controlling means for the mechanism already described, a driving shaft 16 is driven from any suitable source of power, and is provided with a clutch 17 which may be either manually or automatically operated. The shaft 16 is mounted in bearings 18, 19 and 20 in the machine frame. Fixed on shaft 16, (Figs. 3 and 4) is a worm 21, with which meshes a worm wheel 22. Worm wheel 22 is fixed on a shaft 23, and fixed also on shaft 23 is a cam cylinder 24, which governs and times the operation of the different parts of the machines as will be later described.

Referring now in detail to the actuating mechanism for swinging the core 3 to and from casting position and for operating the receding back 12 of the drag, there is fixed on shaft 16 a beveled gear wheel 30, which meshes with two gear wheels 31 and 32, mounted loosely on a shaft 33, which shaft is journaled in bearings 34 and 35 in the machine frame. Between the beveled gears 31 and 32 is a clutch member 36, splined to but slidable along shaft 33 into engagement alternatively with either bevel gear 31 or 32, to drive the shaft 33 in one direction or the other. The clutch 36 also has a central position, out of mesh with both pinions 31 and 32, to provide the necessary dwells for the core and the receding back of the drag.

The clutch member 36, as embodied, is automatically operated by a yoke lever 38 engaging in an annular groove 39 in the clutch member 36. Lever 38 is pivoted at 40 on the machine frame. A pivoted link 41 connects the lever 40 with a lever 42, which lever is pivoted at 43 upon the machine frame. The other end of lever 43 cooperates with a cam groove 44 formed in the cam cylinder 24. By this means the operation of the core 3 and of the receding back 12 is properly timed in connection with the other functions of the machine.

The further connections and controls, as embodied, for the mechanism just mentioned comprise a beveled gear wheel 46 fixed on shaft 33, and meshing with a bevel gear wheel 47, which is fixed on a vertically disposed shaft 48, and supported on a bearing 49 on the machine frame. Shaft 48 is also provided with an enlarged hub or sleeve 50 within the bearing 49. The hinges 4, 5 and 6 are fixed to the shaft 48 by suitable means, such as pins or clamping bolts 51, 52 and 53, respectively.

Referring now to the additional actuating means for the receding back 12, a bevel gear wheel 60 is fixed on shaft 48, and meshing therewith is a bevel gear 61, fixed on a shaft 62, which is journaled in bearings 63 and 64 on the machine frame. On the opposite end of shaft 62 is a bevel gear 65, with which meshes a bevel gear 66, which is fixed on a shaft 67, journaled in bearings 68, 69 and 70 formed on the machine frame, that is, in this instance, on the fixed part of the vertically disposed drag. Fixed on shaft 67 is an eccentric 71, working within an eccentric strap 72, which is pivotally connected at 73 to the movable back 12 of the drag. The matrix clamps 13 and 14 operate in the usual manner, being pressed home to the casting position of Fig. 7 by the core, and automatically springing out to the matrix stripping position of Fig. 8 when the core swings away from casting position. The matrix clamps form the straight edges of the casting chamber in the usual manner.

In the preferred form of the invention, the plate is cast with a tail or waste portion at each end thereof. In the bottom end, there are preferably three recesses $w$, $y$, and $z$, with which the plate carrier engages to take the plate out of the drag. The recesses $w$ and $z$ are formed in the cast plate by projections on the core 3. The recess $y$ is formed in the cast plate by a projection 10 (Fig. 3), which is mounted on the receding back 12 and thus withdraws from recess $y$ when the back 12 recedes in the matrix stripping operation. The end rings for the matrix sheet are indicated as 9 and 11.

Referring now in detail to the embodied form of plate carrier, this carrier as already stated, is adapted to engage the cast plate as it stands in casting position in the vertically disposed drag, to engage it on its lower curved edge, to remove it from the drag supported on said edge, and to rotate it as it is so moved to a horizontal position wherein it rests on the carrier upon its straight edges, and from this position to deliver it into the plate trimming mechanism.

As embodied, (Figs. 1, 2, 3, 5 and 9), the plate carrier comprises a part reciprocable to and fro along a horizontally disposed guideway and a part pivotally mounted thereon and having swinging movement thereon to handle the plate in the manner described. In this embodiment, the swinging part 80 is provided with a semi-circular member 81, which is preferably provided centrally with a projecting lug 82, adapted to fit into the projection $y$, formed in the bottom of the cast plate $x$ (Figs. 1 and 11). At either side the supporting member 81 is provided with projections 83 and 84 adapted to fit into recesses $w$ and $z$ formed in the cast plate $x$ (Fig. 11). Just within the projections 83 and 84 and adapted to fit closely against the inner curved surface of the semi-cylindrical plate $x$ are projections or seats 85 and 86. Projecting vertically from the supporting part 81 for the curved end of the plate is the part of the carrier 80 which is adapted to support the straight edges of the plate. Said part is provided with two arms 87 and 88, provided with seats 89 and 90 for the straight edges of the plate, which extend well along the straight edges to hold the plate firmly in its seat during the turning of the plate on its carrier.

The portion of the plate carrier just described is pivotally mounted on the other portion of the carrier, already referred to as reciprocably traveling along guideways on the frame, and which is reciprocable to and fro between the casting mechanism and the trimming mechanism, or a place of delivery for the cast plate when the trimming mechanism is not employed. As embodied (Figs. 1, 3, 5, 6 and 9), the carrier 80 is provided with arms 91 and 92, projecting outwardly and downwardly therefrom and fixed to a shaft 93, which shaft is journaled in brackets 94 and 95 formed on the reciprocably traveling body 96 of the plate carrier. This body 96 of the plate carrier is provided with downwardly projecting parts 97 and 98, formed on their under and inner sides to fit upon and slide along parallel, horizontally disposed guideways 99 and 100 formed on the machine frame.

The means for rotating or swinging the plate carrier between plate receiving and plate delivering position as embodied, comprises a sleeve 101, fixed centrally to shaft 93 and downwardly extending from this sleeve 101 are arms 102 and 103. Arm 102 has a pin 104 projecting horizontally therefrom into a cam way or guideway 105 formed in the machine frame. Arm 103 has a similar pin 106 projecting into a similar guideway 107 formed in the machine frame. The shape of the camways 105 and 107 is such as to give the required movement to the plate carrier (as best indicated in Fig. 10) to turn the plate from the vertical receiving position to the horizontal delivery position.

The means for reciprocating the cast plate carrier to and fro between plate receiving and plate delivering position as embodied comprises a straight rack or gear 115 extending horizontally along the machine frame beneath the plate carrier. Journaled in the bottom part of the body 96 of the plate carrier is a shaft 116 (Figs. 1, 3 and 5) and keyed thereto to rotate therewith is a geared pinion 117, within a housing, and which meshes with the straight rack 115, (Fig. 12).

Fixed also on shaft 116 is a worm wheel 118, the worm wheel 118 being located within a housing 119, formed on the plate carrier. Worm wheel 118 meshes with a worm 120, which is mounted upon a floating shaft 121 and connected thereto by a spline 122, whereby the shaft and worm will rotate together, but the worm will slide freely along the shaft. Shaft 121 at one end thereof is provided with bearings 123 and 124, and fixed to the shaft between said bearings is a gear wheel 125. Meshing with gear wheel 125 is a gear wheel 126, fixed on a shaft 127, which shaft is journaled at 128, 129, 130 and 131 in the machine frame.

Mounted loosely on shaft 127 are two bevel gear wheels 132 and 133, both said gear wheels meshing with a bevel pinion 134. Pinion 134 is fixed on a shaft 135, journaled at 136 and 137 in the machine frame. Fixed also on shaft 135 is a bevel gear 138, and meshing therewith is a bevel gear 139, fixed on a shaft 140, which shaft is journaled in bearing 141 and 142 upon the machine frame. Fixed to shaft 140 is a bevel gear wheel 143, with which meshes a bevel gear wheel 144, which is fixed on the shaft 16.

In the embodied form of means for reversing and controlling the travel of the plate carrier in harmony with the operations of the other mechanisms, a clutch member 154 is mounted upon shaft 127 to rotate therewith, but being slidable therealong to pass alternatively into engagement with either of the pinions 132 or 133 to reverse the direction of the drive of shaft 127 by shaft 135, or to stop in intermediate position, out of mesh with both pinions, to provide the dwells for the plate carrier. Clutch member 154 is provided with an annular groove 155, which is engaged by a yoked lever 156 pivoted at 157 on the machine frame.

Pivotally connected to the other end of lever 156 is a rod 158, the other end of the rod 158 being pivotally connected at 159 to a lever 160, which lever is pivotally supported at 161 upon the machine frame. At its opposite end, lever 160 is pivotally connected to a rod 162, the other end of the rod being pivotally connected to a lever 163, which lever is pivotally supported at 164 upon the machine frame. Lever 163 has its other end cooperating with a groove cam 165 formed in the cam drum 24.

The manner of operation of the mechanism just described is substantially as follows:—

The casting mechanism may be regarded as in the closed or casting position just subsequent to the casting of the plate. Cam groove 44 in drum 24 operates lever 42 to drive shaft 33 in the proper direction, from shaft 16, and shaft 48 is partially rotated, thereby swinging the core 3 to the open or broken line position of Fig. 1, and at the same time the back 12 of the drag is moved from the position of Fig. 7 to that of Fig. 8, and the matrix 15 is stripped from the just cast plate $x$. Clutch 36 will then be moved to neutral position and will remain there until the plate carrier taking away the cast plate is clear, when it will be moved into engagement with the other of the two pinions 31 or 32, and will close the core 3 and back 12 ready for the next casting operation.

As soon as the core 3 is clear, the plate carrier 80 moves to the right in Fig. 3, being in, or brought to, the vertical or broken line position of Fig. 3, and the projection 82 passes into the recess $y$ and the projections 83 and 84 pass into the recesses $w$ and $z$, the straight edges of the plate $x$ resting against the seats 89 and 90. The projections 82, 83 and 84 are slightly beveled at their forward end and are just thick enough to ease the plate $x$ from its seat in the drag, so that it will rest firmly upon the plate carrier and will move backwardly therewith.

The plate carrier then moves backwardly carrying the plate toward the trimming mechanism or place of delivery. During this movement the pins 104 and 106 are running in the cam grooves 105 and 107, respectively, and because of the shape of these grooves, the plate carrier is given a quarter turn about shaft 93 from the broken line position of Figs. 3 and 10, to the full line position of said figures, and the plate is then in horizontal position to be delivered into the finishing mechanism, as shown in Fig. 2. On the reverse movement of travel of the plate carrier, the plate supporting member 80 moves in the opposite direction as indicated by the arrows in Fig. 10.

The operation of the driving and controlling mechanism during the foregoing function of the plate carrier is substantially as follows:

Shaft 140 and shaft 135 are driven from shaft 16, as already described, and lever 163 will throw clutch 154 to drive shaft 127 in a given direction. This will drive shaft 121 in a corresponding direction and worm 120 will drive worm wheel 118, rotating shaft 116, and pinion 117 will roll along rack 115, traveling the plate carrier along the guides 99 and 100 in the desired direction. Lever 163 will then be moved to throw the clutch 154 into neutral position for the desired period of dwell, and will then throw it into engagement with the other of the two bevel gears 132 and 133, to effect the travel of the plate carrier into reverse direction and will provide the necessary dwell at the opposite end of its travel.

In the embodied form of plate trimming mechanism, a machine is shown of the general type or kind illustrated and described in United States Patent No. 1,126,741 to Evensen, dated February 2, 1915. This plate trimming machine is adapted to receive the plate $x$ running on its straight edges into the interior of a cylinder, the plate being clamped therewithin, and given one complete rotation during which the ends of the plate are trimmed and also the interior ribs thereof. The plate is then slid on its straight edges out of the trimming mechanism, traveling in the same direction in which it entered the trimming mechanism along a trackway 188, being sent forward to a place of delivery or otherwise disposed of. It will be understood that so far as concerns certain features of the invention, the plate may be delivered directly from the casting mechanism without being sent into the trimming machine by the plate carrier.

In the embodied form of means for delivering the plate to the trimming means, a reciprocating bar 180 is mounted in the upper part of the trimming machine 181, the bar being provided with a straight gear rack 182, with which meshes a gear wheel 183, mounted on a shaft 184. Fixed also on shaft 184 is a gear wheel 185, which meshes with a reciprocating geared sector 186, which is reciprocated by any suitable driving mechanism. Bar 183 has pivoted to the end thereof a depending finger 187 which engages the plate $x$ on the plate carrier, as shown in Fig. 2 and pushes it into the trimming mechanism. Suitable means will be employed to prevent the finger 187 defacing plate $x$, as its end may be covered with protective material, such as soft leather or any other suitable material, if found necessary. Any convenient mechanism could be employed for raising and lowering the finger if desired.

The conveyor arm 180 for the trimming mechanism may be started into operation from the casting mechanism by any suitable means. As shown a trip lever 189 for a clutch for the conveyor is operated by the plate carrier, or a cam control of any suitable form might be arranged on one of the shafts of the casting mechanism. The trimming mechanism may also be started on its rotary trimming movement by any suitable automatically operating mechanism, which may be like that already described for the conveyor. As shown, an arm 190, corresponding to the starting arm 58 in the Patent No. 1,126,741 referred to, is engaged by an arm 191 extending outwardly from the bar 180. An automatic conveyor 192 of any known or adequate form may be employed to automatically remove the trimmed plate $x$ from the trimming mechanism.

In Fig. 13 is shown diagrammatically an automatic hot metal supply for the casting mechanism. The pump 200 has its lever 201 connected by a pivoted link 202 to a cam-actuated lever 203, which is pivotally supported at 204. Lever 203 is operated by a cam 205 on shaft 16. If clutch 17 is left in, the machine will run continuously, casting and re-casting from a single matrix.

If only a single cast plate from a particular matrix is required, the clutch 17 may be provided with any standard or adequate form of throw-out for one cycle of the machine, or the clutch may be operated manually. In Fig. 14 there is shown a form of throw-out which will stop the machine automatically after each plate is cast, or will cause the continuous operation of the machine.

In Fig. 14 the control lever 206 for clutch 17 is held in driving position by a detent latch 207, which is pivoted at 208, and has its nose beveled so that the lever 206 will pass underneath and be held when the clutch is thrown into driving position. The tail of lever 207 is pivoted at 216 to a connecting link 209, the other end of the link being pivoted at 210 to a cam lever 211.

Cam lever 211 is pivoted at 212 and is actuated by a cam 213 on cam roll 24. When lever 211 is tripped by cam 213, lever 206 is released, and the spring of clutch 17 will throw out the clutch. When the clutch is thrown in by hand, detent 207 will automatically hold it until cam 213 releases it.

Means are provided whereby, if continuous operation is desired, as when a number of plates are cast from one matrix, lever 206 will be held in operative position. As shown a detent 214 is pivoted on support 208, but free from detent 207. This detent 214 is provided with a finger piece 215. When single casts are made, detent 214 will be swung back over its center to idle position. When successive casts from one matrix are to be made, and detent 214 is in the full line position of Fig. 14, the automatic operation of detent 207 will have no effect on lever 206.

The invention in its broader aspects is not limited to the specific mechanisms shown and described but departures may be made therefrom within the scope of the accompanying claims without departing from the principles of the invention and without sacrificing its chief advantages.

What I claim is:—

1. A machine for making stereotype plates including in combination a plate casting mechanism comprising a core and a drag, a plate trimming mechanism and automatically operating means for taking a cast plate from the drag and inserting it in the trimming mechanism.

2. A machine for making stereotype plates including in combination a vertically disposed core and drag, a plate trimming mechanism and automatically operating means for taking a cast plate from the drag and inserting it in the trimming mechanism.

3. A machine for making stereotype plates including in combination a casting chamber comprising a vertically disposed core and drag, a plate trimming mechanism and means entirely out of engagement with the casting mechanism during the casting operation for taking a cast plate from the drag in vertical position and delivering it in horizontal position into the trimming mechanism.

4. A machine for making stereotype plates including in combination a casting mechanism, a trimming mechanism, and means out of engagement with the casting mechanism during the casting operation, and movable toward it after completion of the casting, for taking a plate in one position from the casting mechanism and turning the plate into a transverse position and delivering it into the trimming mechanism.

5. A machine for making stereotype plates including in combination a casting mechanism, a trimming mechanism, and means entirely out of engagement with the casting mechanism during the casting operation for conveying a plate from the casting mechanism to the trimming mechanism and for turning it while it is being so conveyed.

6. A machine for making stereotype plates including in combination a casting mechanism, a trimming mechanism, and automatically operating means out of engagement with the casting mechanism during the casting operation, and movable toward it after completion of the casting, for taking a plate in one position from the casting mechanism and turning the plate into a transverse position and delivering it into the trimming mechanism.

7. A machine for making stereotype plates including in combination a casting mechanism, a trimming mechanism, and automatically operating means external to the casting mechanism for conveying a plate from the casting mechanism to the trimming mechanism and for turning it while it is being so conveyed.

8. A machine for making stereotype plates including in combination casting mechanism, trimming mechanism, and means for engaging a previously cast plate by a curved end and conveying it into the trimming mechanism.

9. A machine for making stereotype plates including in combination casting mechanism, trimming mechanism, and means separate from the casting mechanism and movable into it after the casting is completed for engaging a plate by a curved end and conveying it into the trimming mechanism upon its straight edges.

10. A machine for making stereotype plates including in combination casting mechanism including a core and drag, a trimming mechanism, and means traveling to and fro between the drag and the trimming mechanism for engaging a plate in the drag by a curved edge and conveying it into the trimming mechanism.

11. A machine for making stereotype plates including in combination casting mechanism including a core and drag, a trimming mechanism, and automatically operating means separate from the casting mechanism and traveling to and fro between the drag and trimming mechanism for engaging a plate in the drag by a curved edge and conveying it into the trimming mechanism.

12. A machine for making stereotype plates including in combination casting mechanism including a core swinging about a vertical axis and a drag, a trimming mechanism, and means for engaging a plate in the drag by a curved edge and conveying it into the trimming mechanism upon its straight edges.

13. A machine for making stereotype plates including in combination casting mechanism including a core and drag, a trimming mechanism, and automatically operating means entirely out of engagement with the casting mechanism during the casting operation for engaging a plate in the drag by a curved edge and conveying it into the trimming mechanism upon its straight edges.

14. A machine for making stereotype plates including in combination casting mechanism comprising a stationary drag and a movable core and means entirely out of engagement with the casting mechanism during the casting operation and movable into the opened casting mechanism after the casting is completed, for engaging the cast plate in the drag and removing it therefrom.

15. A machine for making stereotype plates including in combination casting mechanism comprising a stationary drag and a movable core swinging about a vertically disposed axis and automatically operating means for engaging the cast plate in the drag and removing it therefrom.

16. A machine for making stereotype plates including in combination casting mechanism comprising a stationary drag and a movable core and means including a reciprocating carriage and a movable plate holder mounted thereon for engaging the cast plate in the drag by its curved edge and removing it therefrom.

17. A machine for making stereotype plates including in combination casting mechanism comprising a stationary drag and a movable core and automatically operating means including a reciprocating carriage and a rocking plate holder mounted thereon for engaging the cast plate in the drag by its curved edge and removing it therefrom.

18. In a stereotype plate making machine in combination a plate carrier having means for engaging with a previously cast plate supporting the plate by both a curved and a straight edge and means for operating the plate carrier.

19. In a stereotype plate making machine in combination a plate carrier having a carriage and a plate support movably mounted thereon for engaging a previously cast plate and for supporting the plate by both a curved and a straight edge and means for moving the plate carrier to change the support from one of said edges to the other.

20. In a stereotype plate making machine in combination a plate carrier having a carriage and a plate support movably mounted thereon for engaging a previously cast plate and for supporting the plate by both a curved and a straight edge and automatically operating means for moving the plate carrier relatively to the carriage to change the support from one of said edges to the other.

21. A machine for making stereotype plates including in combination a stationary vertical drag, a traveling cooperating core, and a carrier entirely out of engagement with the core and drag during the casting operation, for entering the concave side of the drag subsequently to casting and engaging the plate by its lower curved edge and removing it therefrom.

22. A machine for making stereotype plates including in combination a stationary vertical drag, a traveling cooperating core, and a carrier entirely out of engagement with the core and drag during the casting operation, for entering the concave side of the drag subsequently to casting and engaging the plate by its lower curved edge and removing it therefrom and rotating while carrying the plate to support it on its straight edges.

23. A machine for making stereotype plates including in combination a casting chamber comprising a stationary vertical drag, a traveling cooperating core, and a carrier separate from the casting chamber and taking no part in the casting operation entering the concave side of the drag and engaging the plate by its lower curved edge and removing it therefrom and rotating while carrying the plate to support it on its straight edges and a trimming mechanism receiving the plate while resting on its straight edges.

24. In a stereotype plate making machine casting mechanism including a core and a drag, a carrier having supporting means for a curved end and the straight edges of a plate, means for moving the carrier from a vertical to a horizontal position and means for moving the carrier into the drag for engaging the plate after the completion of the casting operation.

25. In a stereotype plate making machine casting mechanism including a core and a drag, a carrier having supporting means for a curved end and the straight edges of a plate, automatically operating means for moving the carrier from a vertical to a horizontal position and means for moving the carrier into the drag for engaging the plate after the completion of the casting operation.

26. A machine for making stereotype plates including in combination a plate casting mechanism comprising a vertical drag, a movable core pivoted on a vertical axis to swing into and out of the drag, a plate trimming mechanism and means for taking a cast plate from the drag and inserting it in the trimming mechanism.

27. A machine for making stereotype plates including in combination a plate casting mechanism comprising a traveling core and a drag, a stationary plate trimming mechanism and means for taking a cast plate from the drag and inserting it in the trimming mechanism.

28. A machine for making stereotype plates including in combination a vertically disposed traveling core and a drag, a plate trimming mechanism and means for moving the carrier into the drag after completion of the casting operation, for taking the plate just cast from the drag and inserting it in the trimming mechanism.

29. A machine for making stereotype plates including in combination a vertically disposed core and stationary drag, a plate trimming mechanism and means for moving the carrier into the drag after completion of the casting operation, for taking the plate just cast from the drag and inserting it in the trimming mechanism.

30. A machine for making stereotype plates including in combination a vertically disposed traveling core and stationary drag, the core being pivoted on a vertical axis to swing into and out of the drag, a plate trimming mechanism and means for taking a cast plate from the drag and inserting it in the trimming mechanism.

31. A machine for making stereotype plates including in combination a plate casting mechanism comprising a core and a drag, a plate trimming mechanism, and means separate from the core and movable into engagement with the plate in the drag after the separation of the core and drag for taking the cast plate from the drag and inserting it in the trimming mechanism, said means engaging with the bottom edge of the cast plate in the drag.

32. A machine for making stereotype plates including in combination a plate casting mechanism comprising a core and a drag, a plate trimming mechanism, and means separate from the core and movable into engagement with the plate in the drag after the separation of the core and drag for taking the cast plate from the drag and inserting it in the trimming mechanism, said means engaging with the bottom and adjacent edges of the cast plate in the drag.

33. A machine for making stereotype plates including in combination a vertically disposed core and drag, the core being pivoted on a vertical axis to swing into and out of the drag, a plate trimming mechanism and means for taking a cast plate from the drag and inserting it in the trimming mechanism, said means engaging with the bottom edge of the cast plate in the drag.

34. A machine for making stereotype plates including in combination a vertically disposed core and drag, the core being pivoted on a vertical axis to swing into and out of the drag, a plate trimming mechanism and means for taking a cast plate from the drag and inserting it in the trimming mechanism, said means engaging with the bottom and adjacent edges of the cast plate in the drag.

35. A machine for making stereotype plates including in combination a plate casting mechanism comprising a traveling core and a drag, a plate trimming mechanism, and automatically operating means for taking a cast plate from the drag and inserting it in the trimming mechanism.

36. A machine for making stereotype plates including in combination a plate casting mechanism comprising a traveling core and a drag, a stationary plate trimming mechanism, and automtaically operating means for taking a cast plate from the drag and inserting it in the trimming mechanism.

37. A machine for making stereotype plates including in combination a vertically disposed traveling core and drag, a plate trimming mechanism, and automatically operating means for taking a cast plate from the drag and inserting it in the trimming mechanism.

38. A machine for making stereotype plates including in combination a vertically disposed core and stationary drag, a plate trimming mechanism, and automatically operating means for taking a cast plate from the drag and inserting it in the trimming mechanism.

39. A machine for making stereotype plates including in combination a plate casting mechanism comprising a core and a drag, a plate trimming mechanism, and means separate from the drag and core and taking no part in the casting operation, movable into the drag after completion of the casting operation for taking the plate just cast from the drag and inserting it in the trimming mechanism.

40. A machine for making stereotype plates including in combination a vertically disposed core and drag, the core being pivoted on a vertical axis to swing into and out of the drag, a plate trimming mechanism and means separate from the drag for taking a cast plate from the drag and inserting it in the trimming mechanism.

41. A machine for making stereotype plates including in combination a plate casting mechanism comprising a traveling core and a drag, a plate trimming mechanism and automatically operating means for taking a cast plate from the drag and inserting it in the trimming mechanism.

42. A machine for making stereotype plates including in combination a plate casting mechanism comprising a core and a stationary drag, a plate trimming mechanism and automatically operating means for taking a cast plate from the drag and inserting it in the trimming mechanism.

43. A machine for making stereotype plates including in combination a plate casting mechanism comprising a traveling core and a drag, a plate trimming mechanism and automatically operating means for taking a cast plate from the drag and inserting it in the trimming mechanism, said means engaging with the bottom edge of the cast plate in the drag.

44. A machine for making stereotype plates including in combination a plate casting mechanism comprising a core and a stationary drag, a plate trimming mechanism and automatically operating means for taking a cast plate from the drag and inserting it in the trimming mechanism, said means engaging with the bottom edge of the cast plate in the drag.

45. A machine for making stereotype plates including in combination a plate casting mechanism comprising a core traveling to and from casting position and a drag, a plate trimming mechanism and means separate from the core and drag and movable into engagement with the plate just cast for taking the cast plate from the drag and inserting it in the trimming mechanism.

46. A machine for making stereotype plates including in combination a vertically disposed core traveling to and from casting position on a vertical axis, and a drag, a plate trimming mechanism and means for taking a cast plate from the drag and inserting it in the trimming mechanism.

47. A machine for making stereotype plates including in combination a plate casting mechanism comprising a core traveling to and from casting position and a drag, a plate trimming mechanism and means for taking a cast plate from the drag and inserting it in the trimming mechanism, said means taking no part in the casting operation and being movable into the drag after completion of the casting operation, for engaging with the bottom edge of the cast plate in the drag.

48. A machine for making stereotype plates including in combination a vertically disposed core traveling to and from casting position on a vertical axis, and a drag, a plate trimming mechanism and means for taking a cast plate from the drag and inserting it in the trimming mechanism, said means engaging with the bottom edge of the cast plate in the drag.

49. A machine for making stereotype plates including in combination a plate casting mechanism comprising a core traveling to and from casting position and a drag, a plate trimming mechanism and means for taking a cast plate from the drag and inserting it in the trimming mechanism, said means taking no part in the casting operation and being movable into the drag after completion of the casting operation, for engaging with the bottom and adjacent edges of the cast plate in the drag.

50. A machine for making stereotype plates including in combination a vertically disposed core traveling to and from casting position on a vertical axis, and a drag, a plate trimming mechanism and means for taking a cast plate from the drag and inserting it in the trimming mechanism, said means engaging with the bottom and adjacent edges of the cast plate in the drag.

51. A machine for making stereotype plates including in combination a plate casting mechanism comprising a core traveling to and from casting position and a drag, a plate trimming mechanism and automatically operating means for taking a cast plate from the drag and inserting it in the trimming mechanism.

52. A machine for making stereotype plates including in combination a vertically disposed core traveling to and from casting position and a drag, a plate trimming mechanism and automatically operating means for taking a cast plate from the drag and inserting it in the trimming mechanism.

53. A machine for making stereotype plates including in combination a plate casting mechanism comprising a core traveling to and from casting position and a stationary drag, a plate trimming mechanism and automatically operating means for taking a cast plate from the drag and inserting it in the trimming mechanism.

54. A machine for making stereotype plates including in combination a vertically disposed core traveling to and from casting position and a stationary drag, a plate trimming mechanism and automatically operating means for taking a cast plate from the drag and inserting it in the trimming mechanism.

55. A machine for making stereotype plates including in combination a plate casting mechanism comprising a core traveling to and from casting position and a stationary drag, a plate trimming mechanism and automatically operating means for taking a cast plate from the drag and inserting it in the trimming mechanism, said means engaging with the bottom edge of the cast plate in the drag.

56. A machine for making stereotype plates including in combination a plate casting mechanism comprising a core traveling to and from casting position and a stationary drag, a plate trimming mechanism and automatically operating means for taking a cast plate from the drag and inserting it in the trimming mechanism, said means engaging with the bottom and adjacent edges of the cast plate in the drag.

57. A machine for making stereotype plates including in combination a vertically disposed core traveling to and from casting position and a stationary drag, a plate trimming mechanism and automatically operating means for taking a cast plate from the drag and inserting it in the trimming mechanism, said means engaging with the bottom edge of the cast plate in the drag.

58. A machine for making stereotype plates including in combination a vertically disposed core traveling to and from casting position and a stationary drag, a plate trimming mechanism and automatically operating means for taking a cast plate from the drag and inserting it in the trimming mechanism, said means engaging with the bottom and adjacent edges of the cast plate in the drag.

59. A machine for making stereotype plates including in combination a casting chamber, a vertically disposed core and drag, a plate trimming mechanism and means separate from the casting chamber taking no part in the casting operation and movable into engagement with the plate just cast, for taking the cast plate by its edges from the drag in vertical position and delivering it in horizontal position into the trimming mechanism.

60. A machine for making stereotype plates including in combination a vertically disposed core and drag, means for swinging the core from casting position about a vertical axis, a plate trimming mechanism, and means movable into the drag after separation of the core and drag for taking the plate just cast from the drag in vertical position and delivering it in horizontal position into the trimming mechanism.

61. A machine for making stereotype plates including in combination a vertically disposed core and drag, the core being pivoted on a vertical axis to swing into and out of the drag, a plate trimming mechanism, and means entering the casting chamber from without for taking a cast plate from the drag in vertical position and delivering it in horizontal position into the trimming mechanism.

62. A machine for making stereotype plates including in combination a vertically disposed core and drag, a plate trimming mechanism, and automatically operating means for taking a cast plate from the drag in vertical position and delivering it in horizontal position into the trimming mechanism.

63. A machine for making stereotype plates including in combination a casting mechanism, a trimming mechanism, and means for taking a plate in one position from the casting mechanism by passing into engagement with the edges of the cast plate and turning the plate into a transverse position and delivering it into the trimming mechanism.

In testimony whereof, I have signed my name to this specification.

JOHN D. MORGAN.